United States Patent [19]
Dziomba et al.

[11] 3,768,499
[45] Oct. 30, 1973

[54] ARRANGEMENT FOR THE SETTING OF THE ACID OR ALKALI CONCENTRATION FOR CHEMICAL BATHS HAVING HIGH ACIDITY OR ALKALINITY

[75] Inventors: Willy Dziomba; Rainer Beule, both of Wolfsburg; Gunter Dreyer, Kl. Sissbeck; Gerhard Wolf, Wolfsburg, all of Germany

[73] Assignee: Volkswagenwerk Aktiengesellschaft, Wolfsburg, Germany

[22] Filed: June 18, 1971

[21] Appl. No.: 154,351

[30] Foreign Application Priority Data

July 3, 1970 Germany .................. P 20 32 991.3

[52] U.S. Cl. .................................................. 137/93
[51] Int. Cl. .......................................... G05d 11/08
[58] Field of Search .................... 204/290 F; 137/93

[56] References Cited

UNITED STATES PATENTS

| | | | |
|---|---|---|---|
| 3,592,212 | 7/1971 | Schleimer et al. | 137/93 |
| 3,135,673 | 6/1964 | Tirrell et al. | 204/290 F |
| 3,477,930 | 11/1969 | Crites | 204/148 X |
| 3,532,102 | 10/1970 | Glassey | 137/93 X |
| 3,607,549 | 9/1971 | Bielefeld et al. | 137/93 X |

OTHER PUBLICATIONS

IBM Technical Disclosure Bulletin, Vol. 8, No. 12, May 1966, p. 1777.

*Primary Examiner*—Robert G. Nilson
*Attorney*—Ernest F. Marmorek

[57] ABSTRACT

A system for the controlling of the acidity or alkalinity concentration of a bath of chemical solutions having high acidity or alkalinity, the system including a pair of measuring electrodes which enclose therebetween a measuring path, and a dosing arrangement for dosing additional chemical constituent to the bath, when necessary, to keep the acidity and alkalinity at predetermined values, said electrodes being placed from each other in a predetermined distance, such distance defining a measuring path or element the resistance region of which lies within the sensitivity region of the measuring circuit.

9 Claims, 3 Drawing Figures

INVENTORS.
WILLY DZIOMBA,
RAINER BEULE,
GÜNTER DREYER and
GERHARD WOLF
BY [signature]
THEIR ATTORNEY.

ARRANGEMENT FOR THE SETTING OF THE ACID OR ALKALI CONCENTRATION FOR CHEMICAL BATHS HAVING HIGH ACIDITY OR ALKALINITY

FIELD OF THE INVENTION

The present invention relates to an arrangement for the setting of the acid or alkali concentration for chemical baths having high acidity or alkalinity, by employing a conductivity measuring device having measuring electrodes which enclose between themselves a measuring path or element, and an adding dosing device.

BACKGROUND OF THE INVENTION

For electrolytes having high acidity or alkalinity one cannot employ a potentiometer - type measuring device of the acidity content. The conductivity of such electrolyte is very high and the changes in the conductivity vary only very little with corresponding changes of the acid or lye concentration. It is, therefore, becomes impossible to use conventional conductivity measuring instruments having rated value limitations, such as described in "SIEMENS TASCHENBUCH FUR MESSEN UND REGELN IN DER WARME UND CHEMIETECHNIK." The last mentioned devices which are based on the principle of resistance measuring can be used with acidity concentrations up to about 10g/liter.

BRIEF SUMMARY OF THE INVENTION

It is, therefore, an object of the present invention to provide an arrangement for the setting of the acid or alkali concentration which can be used also in the presence of high acidity or alkalinity, and which is capable of being used with acid or alkaline baths having a concentration of up to 60g per liter or above.

Accordingly, the present invention provides that at least two electrodes for a bath are arranged on a distance with respect to each other on a measuring path and that the resistance range of the measuring path lies within the sensitivity region of the measuring circuit. According to the present invention the measuring path preferably lies in a shunt circuit with respect to the electrolyte circulating system.

In order that a high acidity content could be present, preferably electrodes made from precious metal plated expanded titanium are used. In a further development of the present invention the electrodes are rolled and are arranged in a chemically resistant cylindrically shaped sleeve. As a result, a very large surface within a small space is obtained. Obviously such electrodes can be used also for other purposes and can be made also from a titanium bar.

The measuring path is formed from a preferably flexible chemically resistant conductor which can be reeled up.

In order to supress the disturbing currents, according to the present invention chemically resistance metallic pipes are placed behind the measuring paths and are connected with each other in a conductive manner. The distance between the metal pipes and an associated ajacent electrode must be a multiple of the measuring path.

An advantage of the invention resides in that the distance between the electrodes and, thereby that of the measuring path, can be changed as desired and thereby the measuring arrangement according to the present invention can be easily adapted to different electrolytes. As a result, the device according to the present invention has a wide range of applicability.

As a result of the possibility that the electrolyte conductance can be changed, as desired, by the electrodes, all kinds of space problems become easily solved. It is also possible to place the electrodes in a housing, and then the measuring path becomes formed by the electrolyte conducted in a conduit connectable to the housing. In this manner, the measuring path becomes independent from the position of the electrodes. The conducting connection of the electrodes is acomplished merely through the electrolyte so that when the electrodes are placed in a housing, they must be shielded from each other.

BRIEF DESCRIPTION OF THE DRAWING

The invention will become more readily apparent from the following description of a preferred embodiment thereof shown, by way of example, in the accompanying drawing, in which.

DESCRIPTION OF THE PREFERRED EMBODIMENT

Figures 1, 2, 3:
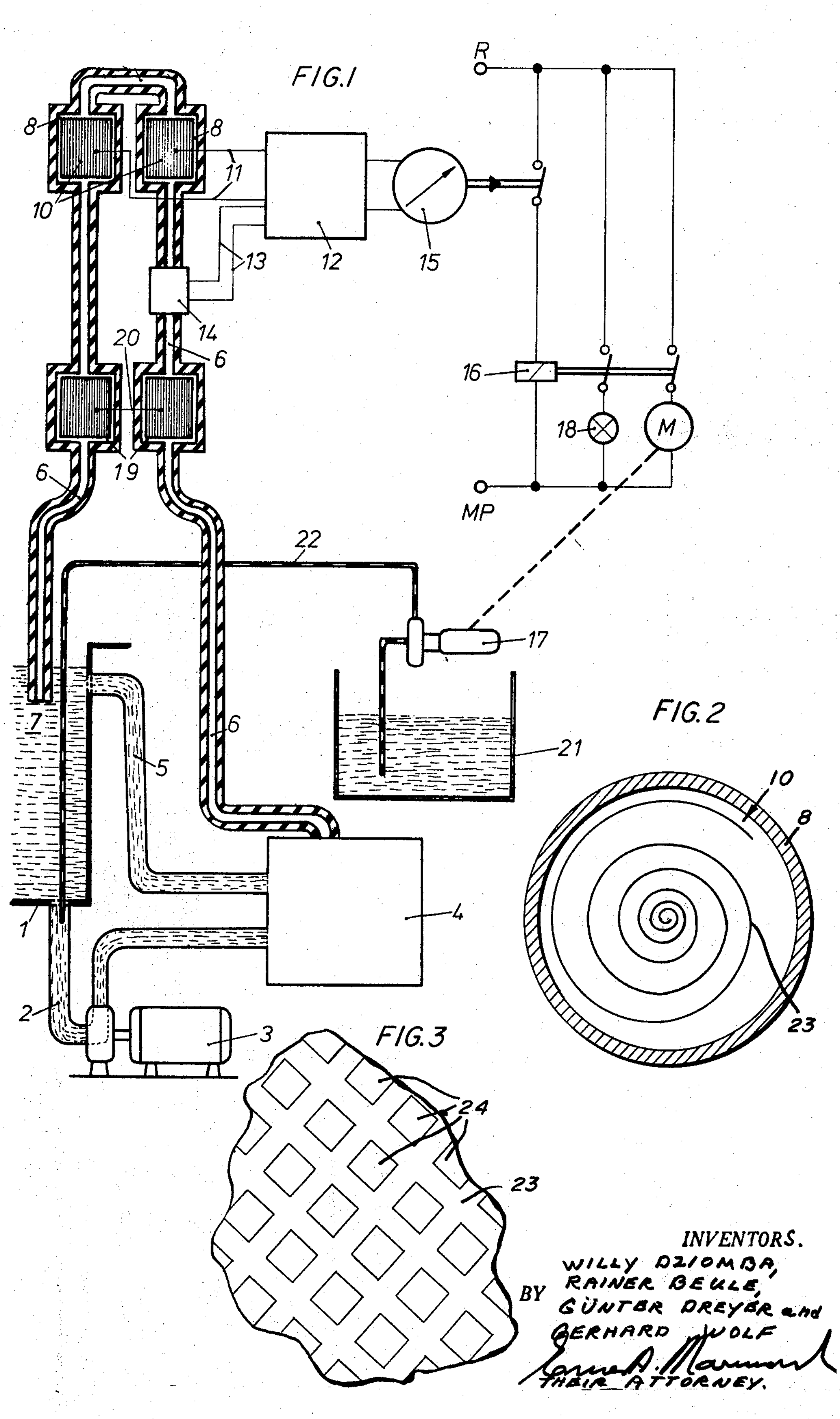
FIG. 1 is a schematic representation of the arrangement according to the present invention.
FIG. 2 is a sectional plan view of a measuring electrode rolled and placed in a sleeve.
FIG. 3 is a cutaway side view of a measuring electrode of FIG. 2.

By means of a pump 3 the electrolyte is pumped from bath 1 over a suction conduit 2 through a filter system 4 and a conduit 5 back into the bath 1. To the filter system 4 a flexible conduit 6 is connected which may, as desired, be directed outside of the bath 1 and returned to the bath 1 at a point 7. In flexible conduit 6 there are a pair of sleeves 8 provided which are flown through by the electrolyte. The sleeves 8 enclose between themselves a measuring path or element 9. The sleeves 8 are completely filled by the electrodes 10, as seen in greater detail in FIG. 2, which over a conductor 11 are connected with the conductivity measuring device 12. The distance between the electrodes 10 and thereby the length of the measuring path 9 can be adjusted by changing the position of the sleeves 8 within the flexible conduit 6. A temperature compensation arrangement which is built into the conductivity measuring device 12 having zero point suppression is coupled by means of a conductor 13 with a temperature sensor 14 which in turn is connected into the flexible conductor 6. Through the conductivity measuring device 12 a measuring instrument 15 having a rated value limiter is coupled to which over a relay 16 a supply pump 17 for the additional dosing is connected. A signal lamp 18 is also arranged in the circuit for providing visual control of the device.

In order that the measuring path or analyzing element 9 could be shielded from disturbing currents which come from the galvanic bath 1, before and after the measuring path 9 there is a pipe means 19 arranged which is resistant to the chemicals used in the electrolyte and is itself placed in the flexible conduit 6. Both pipe sections 19 are inter-connected by means of a conductor 20 in a conducting fashion. The distance of the pipes 19 must always be a multiple of the measuring path or element from the adjacent electrode in order to avoid any influence on the measurement.

In the event that the bath has a slight concentration, this becomes measured by means of electrodes 10 in the conductivity measuring device 12 and this is then processed in the measuring instrument 15 having a rated value contact. Relay 16 connects the supply pump 17 which performs the pumping of the acid or lye from a container 21 into the suction conduit 2 over the dosing conduit 22 until the acid or lye concentration has reached the rated value.

As shown in FIGS. 2 and 3 the electrodes 10 are made of a titanium sheet 23 which is plated with a precious metal such as silver, gold or platinum. The metal sheet 23 may be expanded to produce apertures 24 which facilitate the flow of the solution.

From the above, it is apparent that although the invention has been described hereinbefore with respect to a certain specific embodiment thereof, it is evident that many modifications and changes may be made without departing from the spirit of the invention. For instance, the electrodes 10 can be placed in a housing and the measuring path 9 can be formed by a conduit connectable to the housing so that the path 9 is independent from the position of the electrodes 10. Accordingly, by the appended claims, we intend to cover all such modifications and changes as fall within the true spirit and scope of this invention.

We claim:

1. In a chemical bath arrangement,
in combination,
a container for an acid or alkaline solution,
a system for the controlling of the acidity of alkalinity concentration of the solution, including
conduit means communicating with said container and forming a circulating circuit for said solution,
a pair of measuring electrodes displaceably disposed within said conduit means to define a measuring path of adjustable length therebetween,
measuring means having a sensitivity range and being responsive to conductivity values of said solution within said measuring path,
a dosing arrangement controlled by said measuring means and being operable for delivering additional constituents into said container,
said electrodes being adjustable to be at such a distance from each other as to match said measuring path to said sensitivity range of said measuring means.

2. The combination as claimed in claim 1, wherein said conduit means is a shunt conduit with respect to a main circulating system of the electrolyte solution.

3. The combination as claimed in claim 1, wherein said electrodes comprise expanded titanium plated with a precious metal.

4. The combination as claimed in claim 1, wherein said electrodes are rolled and placed in a cylindrically shaped sleeves of chemically resistive material.

5. The combination as claimed in claim 1, wherein said measuring path comprises a flexible conduit made from a chemically resistive material.

6. The combination as claimed in claim 1 further including electrical screening means disposed within said conduit means at a working distance from said pair of measuring electrodes, said screening means being interconnected for electrically separating said controlling system from the solution within said container.

7. The combination as claimed in claim 6, said electrical screening means comprising a pair of metallic pipe means electrically connected with each other and being placed at a distance to the measuring electrodes corresponding to a multiple of the measuring path.

8. A system for controlling the acidity or alkalinity concentration of a bath of chemical solutions having high acidity or alkalinity, said system including a flexible branch conduit including means for circulating said solution to and from said bath, a pair of measuring electrodes movably disposed within said conduit to define therebetween an adjustable measuring path, and a dosing arrangement for dosing additional consituent to said bath when necessary to keep said acidity and alkalinity at predetermined values, a measuring arrangement connected to said electrodes and controlling said dosing arrangement said path being adjusted according to the resistance of said solution so as to lie within the sensitivity region of th measuring arrangement.

9. A system according to claim 8, wherein said dosing arrangement includes a dosing pump and said measuring arrangement delivers driving pulses controlling said pump.

* * * * *